C. SHERMUND.
VEHICLE SIGNAL DEVICE.
APPLICATION FILED JUNE 21, 1916.

1,223,628.

Patented Apr. 24, 1917.

UNITED STATES PATENT OFFICE.

CONRAD SHERMUND, OF SAN FRANCISCO, CALIFORNIA, ASSIGNOR OF ONE-FOURTH TO GEORGE W. COFIELD, ONE-FOURTH TO BENJAMIN B. SUGARMAN, AND ONE-FOURTH TO ABRAHAM J. SUGARMAN, ALL OF SAN FRANCISCO, CALIFORNIA.

VEHICLE-SIGNAL DEVICE.

1,223,628. Specification of Letters Patent. Patented Apr. 24, 1917.

Application filed June 21, 1916. Serial No. 104,881.

*To all whom it may concern:*

Be it known that I, CONRAD SHERMUND, a citizen of the United States, residing in the city and county of San Francisco and State of California, have invented certain new and useful Improvements in Vehicle-Signal Devices, of which the following is a specification.

The present invention relates to signal devices for vehicles, and more particularly to a visual signal for indicating the movements of the vehicle.

The object of the invention is to provide a signal device of the described type, by means of which the driver may give visual indication of the succeeding movements of his vehicle to others, both in front and in the rear. The device is electrically operated and controlled, and is therefore particularly applicable for use upon motor vehicles, for the reason that such vehicles are commonly provided with a source of electric energy, such as a battery or generator, which may be used for operating the signal device. It is not restricted to motor vehicles, however, but may be used upon other vehicles, with the addition of a comparatively small battery or other source of electricity. The device, moreover, is exceedingly simple, and therefore cheap to manufacture, as well as being effective and easy to operate.

To this end by invention consists in the novel device hereinafter described and herewith illustrated in its preferred form, it being understood that changes may be made in its construction, within the scope of the claims hereto appended, without in any way affecting the essential principles or the value of the invention.

To comprehend the invention, reference should be had to the accompanying drawings, wherein—

Figure 1:
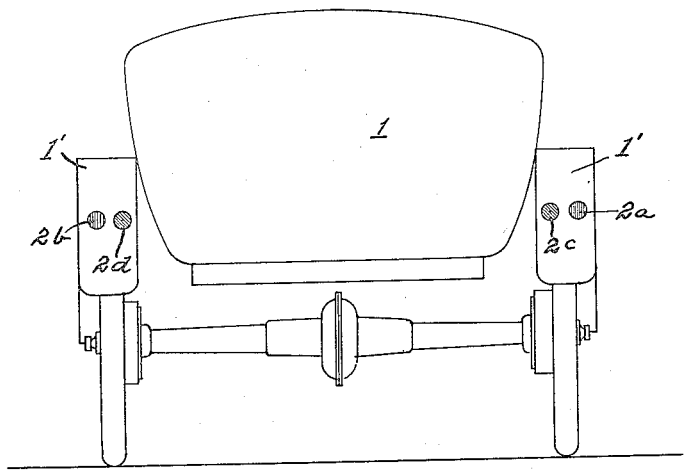
Figure 1 is a rear elevation of a motor vehicle showing the application of my signal device thereto.

In the drawings, the reference numeral 1 designates a vehicle, here represented for purposes of illustration as a motor vehicle. Upon the rear of the vehicle are mounted four electric lamps 2, visible from the rear. Said lamps may be placed in any convenient location, preferably on the rear fenders 1' of the vehicle, and disposed in pairs, two on each side. The lamps are preferably colored, there being one red and one green on each side of the vehicle. In the drawings, $2^a$ and $2^b$ represent red lamps, and $2^c$ and $2^d$ represent green lamps.

An exactly similar set of lamps, that is two red and two green, are mounted on the front of the vehicle, in such a manner as to be visible from in front of said vehicle. It is preferable to place said lamps upon the forward fenders of the vehicle, in which position they are visible to the driver as well as to those in front of said vehicle. Said front lamps, being similar in arrangement to the rear lamps described above, are illustrated only in Fig. 4 of the drawings, wherein they are represented by the reference characters $3^a$, $3^b$, $3^c$ and $3^d$.

Figure 3:
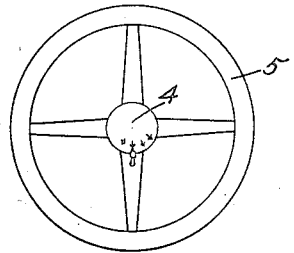
Fig. 3 is a plan view showing a preferred location of the control switch in the center of the steering wheel of the vehicle.

The lamps are controlled by means of a switch 4 mounted within convenient reach of the driver of the vehicle, as, for instance, in the center of the steering wheel 5, as shown in Fig. 3 of the drawings. Said switch has a series of stationary contact points 6, Fig. 4, and a movable contact blade 7 adapted to establish electrical connection with two of said contact points 6 simultaneously.

Figure 4:
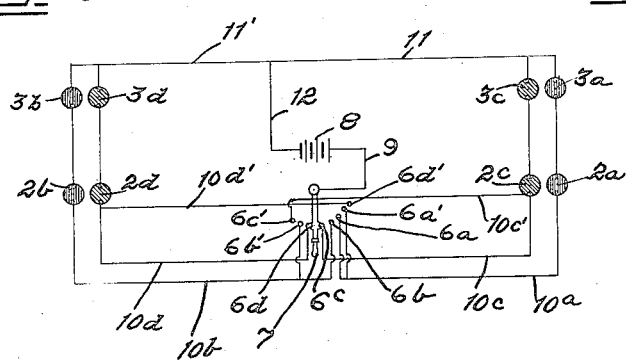
Fig. 4 is a diagram showing the electrical connections for operating the device.

Now, by reference to Fig. 4, it will be seen that when the movable switch blade 7 is in the position shown, contact is made with the points $6^c$ and $6^d$, thereby completing an electric circuit on the right hand side comprising a battery or other source of electric energy 8, a common distributing wire 9, the movable switch blade 7, the wire $10^c$, the rear indicating lamp $2^c$, the front indicating lamp $3^c$, and the return wires 11 and 12; and on the left hand side a parallel circuit comprising said battery 8 and wire 9, the switch blade 7, the wire $10^d$, the rear and front indicating lamps $2^d$ and $3^d$ respectively, and the return wires 11' and 12. Thus the green lamps $2^c$, $2^d$, $3^c$ and $3^d$, are illuminated, showing green lights at both sides of the vehicle.

This is the combination indicating that the vehicle will continue to proceed in a straight path.

When the switch blade 7 is moved to the next position to the right, contact is made with the points 6ª and 6ᵇ, closing the circuits including respectively the wires 10ª and 10ᵇ, and the indicating lamps 2ª and 3ª, and 2ᵇ and 3ᵇ. This combination exhibits red lights at both sides of the vehicle, indicating that said vehicle is about to slow down or stop. The extreme right hand position of the switch blade 7 makes contact with the points 6ª′ and 6ᵈ′, illuminating the lamps 2ª and 3ª, and 2ᵈ and 3ᵈ, and thus exhibiting red lights at the right side and green lights at the left side of the vehicle, to indicate that said vehicle is about to turn to the right. In a similar manner, the switch blade 7, in its extreme left position, makes contact with the points 6ᵇ′ and 6ᶜ′, thereby causing the illumination of the red lamps 2ᵇ and 3ᵇ at the left of the vehicle, and the green lamps 2ᶜ and 3ᶜ at the right thereof, to indicate that said vehicle is about to turn to the left.

Figure 2:
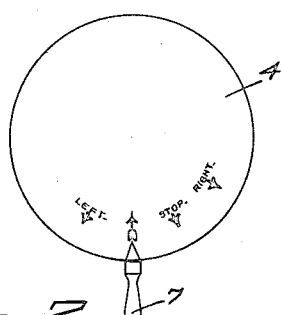
Fig. 2 is a plan view, enlarged, of a preferred form of control switch for operating the signal.

The switch 4 is preferably inscribed with suitable indicating marks and legends, as shown in Fig. 2, to enable the operator to properly locate the movable contact blade 7 thereof. The front indicating lamps 3 are, as before stated, preferably placed in positions easily visible to the driver, and since the front and rear lamps of each indicating circuit are respectively connected in series, the illumination of the front lamps 3 gives the driver positive assurance of the proper illumination of the corresponding rear lamps.

Having thus described my invention, what I claim as new and desire to protect by Letters Patent is:—

1. A signal device for vehicles comprising two similar pairs of differently colored lights positioned at the rear of the vehicle, one pair at each side thereof, and visible from the rear, and two similar pairs of differently colored lights similarly positioned at the front of the vehicle and visible from the front thereof, one light of each pair being colored to indicate danger and the other to indicate safety; means for illuminating said lights; and means under the control of the driver of the vehicle for exhibiting the danger lights upon either side and the safety lights upon the other, or the danger or safety lights upon both sides, to indicate the movements of the vehicle.

2. A signal device for vehicles comprising two similar pairs of lights positioned at the rear of the vehicle and visible from the rear, one pair being positioned at each side of the vehicle, and two similar pairs of lights similarly disposed at the front of the vehicle and visible from the front, one light of each pair being colored green and the other red; means for illuminating said lights; and means under the control of the driver of the vehicle for exhibiting the red lights upon either side of the vehicle, and the green lights upon the other side, or the red or green lights upon both sides simultaneously, to indicate the movements of the vehicle.

3. A signal device for vehicles, comprising two similar pairs of differently colored electric lamps positioned at the rear of the vehicle, one pair at each side thereof, and visible from the rear, and two similar pairs of differently colored electric lamps similarly positioned at the front of the vehicle and visible from the front, one lamp of each pair being colored to indicate danger and the other to indicate safety; a plurality of electric circuits, each including one rear lamp and the correspondingly positioned and similarly colored front lamp; a source of electric energy for illuminating said lamps; and a switch for controlling said circuits to illuminate the danger lamps upon either side and the safety lamps upon the other side, or the danger or safety lamps upon both sides, to indicate the movements of the vehicle.

In testimony whereof I have signed my name to this specification in the presence of two subscribing witnesses.

CONRAD SHERMUND.

Witnesses:
HARRY A. TOTTEN,
D. B. RICHARDS.